3,736,216
TEXTILE ADHESIVE LAMINATES BASED ON POLYURETHANE LATICES

David Trimble Hermann, Belle Mead, and Kenneth Herald Remley, Warner, N.J., assignors to American Cyanamid Company, Stamford, Conn.
No Drawing. Original application Dec. 20, 1968, Ser. No. 785,779, now Patent No. 3,640,924. Divided and this application Sept. 28, 1971, Ser. No. 184,610
Int. Cl. C08g 22/16
U.S. Cl. 161—62             6 Claims

ABSTRACT OF THE DISCLOSURE

Aqueous adhesive compositions containing a dispersed polyurethane polymer, the method of using the adhesive composition in textile applications, and the textile materials thus obtained. The adhesive composition is an aqueous dispersion of a particular class of self-dispersible or emulsifiable polyurethane polymers. The aqueous dispersions are obtained by adding a particular class of isocyanate-terminated polyurethane prepolymers having pendant carboxyl groups to water containing a tertiary aliphatic amine and allowing chain extension with water to proceed until all of the isocyanate groups have been reacted. The resulting polyurethane latex is thickened to the desirable viscosity with suitable thickening agents.

---

This is a divisional application of application Ser. No. 785,779, filed Dec. 20, 1968, now U.S. Pat. No. 3,640,924.

This invention relates to textile adhesive compositions. More particularly, it relates to aqueous adhesive compositions containing a dispersed polyurethane polymer, to the method of using the adhesive composition in textile applications and to the textile materials thus obtained.

Large amounts of adhesives are used in the textile field, particularly in the laminating and flocking arts. Laminating involves the bonding of fabrics, both synthetic and natural, either to one another or to other plastic materials to form a multilayer product. Flocking involves the bonding of short, cut fibers in a perpendicular position to a substrate to form a pile-like material.

Flocked fabrics are assuming an increasingly important place in the textile and related industries. These pile-like materials are manufactured, in general, by coating a substrate with an adhesive and then embedding the ends of short, cut fibers in the adhesive. The thickly arranged cut fibers are oriented vertically to the substrate by various means. Suede-, felt- and velvet-like fabrics are obtained with the shortest fibers and rug and carpet materials and fur-like materials with longer fibers. The flocked fabrics find a wide variety of uses including automotive carpets, linings, window channels and weather strippings, simulated suede effects, design flocking of draperies and similar fabrics, floor coverings, wall coverings, paint rollers, etc.

Substrates have included a variety of woven and non-woven fibrous materials and polymeric sheets, films and foams. Lamination allows the attachment of flocked webs or films to another substrate. Representative substrate materials are cotton, jute, polyester (Dacron), polyvinyl chloride, polyurethane, polyethylene, polystyrene, etc.

A variety of cut fibers or flock, both in the tow and staple forms, are available. They include viscose rayon, nylon, polyester and acrylic, in addition to cotton, wool and cellulose acetate.

Various methods are used for coating and orienting the cut fibers or flock with respect to the substrate. Two of the most important are mechanical vibration, as by the beater-bar system, and electrostatic procedures.

The three factors which primarily determine the quality and wearing properties of a flocked product are adhesives, flock and coating technique. For flocking, adhesives must meet several requirements. For example, floor coverings require good anchoring of the coating to the face, excellent adhesion of the pile and highest wearing and scraping resistance in the dry and wet state. Also, the fibers must be fixed in the vertical position with highest durability. The following properties of the adhesive are also important: the rheological properties, the conductivity and sometimes the dielectric constant (particularly for electrostatic flocking), the surface tension to the base and flock material, the nature of the solvents and their evaporative speed, the viscosity-temperature behavior, etc. In addition to securely adhering the flock to the substrate, the adhesive must be curable under desirable and economical conditions, and the cured adhesive must be durable to exposure to solvent, weather, etc. In the apparel field, resistance to dry-cleaning and/or laundering is particularly important.

As indicated above, laminating in the textile field means the bonding of a fabric to the same or different fabric or fabrics or the bonding of one or more fabrics to plastics materials, including films, sheetings and foams.

The fabrics used in laminating may be woven, knitted or nonwoven. They may contain a wide variety of fabrics, both natural and synthetic, including cotton, rayon, linen, wool, silk, polyester, nylon, cellulose acetate, acrylic, modacrylic, etc., and mixtures thereof.

The plastics materials used in laminating are of a wide variety. The plastics are normally limited to thermoplastic polymers, including poly(vinyl chloride), poly(vinyl acetate), cellulose esters such as cellulose acetate and cellulose acetate-butyrate, poly(vinyl butyral), polyethylene, polypropylene, polyurethane, polyamide, polyesters, etc. This wide variety of plastics materials will not necessarily be found in all forms, i.e., film, sheeting and foams. Film and sheeting are largely made of poly(vinyl chloride), although other plastics are extensively used, as well known in the art. The foams are usually made of poly(vinyl chloride) or a polyurethane, but other polymers, such as polyamides, may also be used.

The laminated textile materials are used in many fields, including apparel, home furnishings and automotive uses. The following specific uses are representative. Suit and coat materials having a laminated lining, possibly with a foam interlining, are popular. Laminated synthetic leathers are used in upholstery, handbags, footwear, etc. A typical foamed vinyl synthetic leather is composed of three layers, (1) a textile backing cloth, (2) an expanded (foamed) poly (vinyl chloride) middle layer and (3) a poly(vinyl chloride) sheeting as the top layer.

The adhesives used in textile laminating should provide products having (1) dimensional stability to washing, dry cleaning and pressing, (2) durability of the bond between two components to washing, dry cleaning and pressing and (3) satisfactory handle and drape characteristics. Furthermore, the adhesive composition must be applicable by the conventional methods for applying adhesive to fabrics or plastics materials, as by doctor blade technique using a plain or gravure transfer roll. The adhesive should be sufficiently viscous to prevent penetration into the fabric or foam. It should be flexible, even when fully cured, and should not age. Although many of the adhesives currently used have a solvent base, aqueous base adhesives are desirable since (1) they can be diluted with water for cleaning purposes, (2) they do not present a fire or explosion hazard, and (3) they have less odor and are nontoxic.

It is therefore an object of this invention to provide an aqueous adhesive composition for general textile bonding purposes, but particularly for laminating and flocking utility. This and other objects of the invention will become apparent as the description thereof proceeds.

An aqueous adhesive composition has now been discovered which is eminently useful as a textile bonding adhesive, particularly for bonding fabric-to-fabric and laminating fabric-to-foamed plastic material. It is useful in other textile bonding applications, such as textile flocking. It is also of value as a binder for nonwoven fabrics, and it may be used as a textile finishing agent, such as a hand modifier, a wrinkle-recovery enhancer or a tear and tensile strength improver for woven and knitted fabrics.

The adhesive composition of this invention is an aqueous dispersion of a particular class of self-dispersible or emulsifiable polyurethane polymers. The aqueous dispersions are obtained by adding a particular class of isocyanate-terminated polyurethane prepolymers having pendant carboxyl groups to water containing a tertiary aliphatic amine and allowing chain extension with water to proceed until all of the isocyanate groups have been reacted. The resulting polyurethane latex is thickened to the desirable viscosity with suitable thickening agents.

The isocyanate-terminated polyurethane prepolymers having pendant carboxyl groups are prepared by reacting an organic diisocyanate with a molecular deficinecy of a mixture of two types of glycol.

The first type of glycol is a non-polymeric glycol containing a pendant carboxyl group and the second type is a conventional polyalkylene ether glycol, or mixtures of such polyalkylene ether glycols.

The organic diisocyanate is an aromatic diisocyanate having the isocyanate groups directly attached to the aromatic ring, such as the tolylene diisocyanates, including 2,4- and 2,6-tolylene diisocyanate and mixtures thereof; methylenebis (4-phenyl isocyanate); p-phenylene diisocyanate; 1,5-naphthylene diisocyanate; and the like. The diisocyanates may contain other substituent groups, such as halo, although those free of such groups are preferred.

The nonpolymeric glycol containing a pendant carboxyl group has the formula:

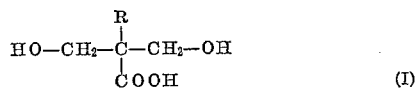

(I)

where R is hydrogen or hydrocarbon radical, preferably lower alkyl (1–3 carbon atoms). The glycols of Formula I are for example 2,2-bis(hydroxymethyl) lower alkanoic acids and they include 2,2-bis(hydroxymethyl)acetic acid, 2,2-bis(hydroxmethyl)propionic, 2,2-bis(hydroxymethyl) butyric acid, and 2,2-bis(hydroxymethyl)valeric acid. The preferred glycol is 2,2-bis(hydroxymethyl)propionic acid.

The polyalkylene ether glycol has the formula:

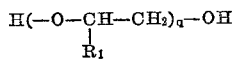

wherein $R_1$ is lower alkyl and $q$ is an integer sufficiently large to provide an average molecular weight for the glycol of at least 750, and up to 5,000, with a preferred average molecular weight range of about 1,700 to about 2,400. Representative glycols include polyethylene ether glycol, poly-1,2-propylene ether glycol, poly-1,2-butylene ether glycol, etc.

In preparing the prepolymer, at least 1.1 mole and up to about 5.0 moles (preferably between 1.6 and 3.0 moles) of the diisocyanate per mole of total glycol should be used. The molar ratio of nonpolymeric glycol containing a pendant carboxyl group to the polyalkylene ether glycol should be between about 0.25:1 to 2:1, preferably between 0.75:1 and 1.25:1. The temperature used for the reaction between diisocyanate and glycols should be between about 50° and 80° C.

The amount of water used with the prepolymer in forming the water-extended polyurethane latex is not critical. Latices of solids content from about 10% up to about 60% can be obtained, although a solids content of 25–50% is preferred. Formation of the latex at room temperature is convenient and practical, although higher or lower temperatures may be used.

The tertiary amine present in the water during the latex formation is a tertiary lower alkylamine including trimethylamine, triethylamine and tripropylamine, for example, preferably triethylamine. The amount of tertiary amine used should be between 2% and 10%, preferably between 3% and 7%, based on weight of prepolymer.

Proper viscosity of adhesive is important to prevent undue penetration of the adhesive into the substrate to which it is being applied. In other words, the bulk of the adhesive should remain on the surface of the substrate to provide good adhesion. Viscosities in the order of 20,000 to 100,000 cps. are normally satisfactory. Suitable thickening agents are used to obtain the desired viscosity, and they include those well-known in the art such as methyl cellulose, hydroxyethyl cellulose, polyacrylic emulsion plus alkali, gums, etc.

The adhesive of the invention can be used with any of the fabrics and plastic sheeting or foams normally used in the laminating processes, these include woven knit and nonwoven fabrics of natural and synthetic fibers, and a variety of plastic sheeting and foams, but particularly those made of poly(vinyl chloride) or polyurethane. In the flocking processes, the adhesive can be used with any of the substrates normally used in the flocking process, including woven and nonwoven fabrics of natural and synthetic fibers, paper, plastic coated fabrics, plastic films and sheets, wood, metal, rubber, glass, etc. Any of the flocking materials may be used. These include both synthetic and natural fibers.

The methods for applying the adhesive to the substrate are conventional and any of the well-known procedures may be used. The assembling of the laminate or flocked fabric is also by conventional procedures. Such methods are well-known in the art.

After the assembly step, it is necessary to dry and cure the adhesive. Drying and curing temperatures between 250° C. and 350° C., preferably between 270° C. and 325° C., are suitable.

The bonding obtained by the adhesive composition of this invention is very durable. It has shown exceptional strength under wet conditions, as during and after laundering.

It appears that the exceptional durability of the adhesive bond to washing and drying may be dependent on the "breaking" of the salt-form of the adhesive during the curing step with formation of the acid-form of the adhesive and free tertiary amine, the latter then volatilizing. This mechanism may explain the necessity for proper selection of the nonpolymeric glycol containing a pendant carboxyl group and the tertiary amine. However, we do not wish to be bound by this theory.

Other agents may be added to the adhesive composition. For some uses it may be desirable to add a thermosetting aminoplast precondensate, such as melamine-formaldehyde and urea or urea-formaldehyde condensate, to improve the solvent resistance of the adhesive. The preferred aminoplast precondensates are melamine-formaldehyde condensates, including alkyl ethers thereof.

The following examples are set forth to illustrate the invention and are not intended to be limitative.

EXAMPLE I 8525 parts polypropylene glycol of 2,000 M.W. was heated to 50° C., and 418 parts of 2,2-bis(hydroxymethyl) propionic acid and 2864 parts of tolylene diisocyanate (80/20 mixture of 2,4- and 2,6-isomers) were slowly and uniformly added thereto. The mixture was heated at 70° C. for about 20 hours. The free NCO content of the prepolymer was about 5.7%.

The prepolymer was added to a stirred solution of 316 parts of triethylamine in 22,200 parts of water at 5° C. to 10° C. The mixture was stirred for about 8 hours at 20° C. to 30° C. The resulting emulsion was about 35% solids and to this there was added a dispersion of 2230 parts of ACRYSOL® ASE-60 (commercial polyacrylic-type of thickening agent of Rohm & Haas) in 5820 parts of water. The adhesive composition, after 1 to 2 hours of stirring, had a viscosity of about 60,000 cps. and contained about 30% solids.

EXAMPLE II

A swatch of woven wool fabric was placed on a flat surface and was covered with a perforated template. A portion of the adhesive composition of Example I was spread evenly and cleanly across the template, thereby applying a pattern of small dots of adhesive to the wool. The template was removed and a swatch of cellulose acetate tricot was placed on the wool. The two pieces of fabric were pressed together for 30 seconds by the weight of a 7 inch by 10 inch by ¼ inch glass plate. The fabric assembly was then heated in an oven at 260° F. for 2 minutes.

The bonded fabric was cut into 1 inch strips. Two strips were placed in boiling water with stirring for 5 minutes and then in cool water. Peel strength of the bond of the dry and wet strips was determined with a spring scale. On average, the peel strength of the wet strips was 72% of the peel strength of the dry strips.

Strips of the bonded fabric were also stirred in polychloroethylene for 10 minutes. Peel strengths of the dry and wet strips were also determined. The peel strength of the wet strips was 54% of the dry strips.

This example illustrates the durability of the adhesive bond in both aqueous and organic solutions, comparable to conventional laundering and dry cleaning conditions.

EXAMPLE III

Using commercial equipment, a woven wool fabric was continuously coated with the adhesive composition of Example I, and contacted with sheet polyurethane foam. The foam side of the thus formed laminate was then coated with the adhesive and contacted with cellulose acetate tricot. The fabric-foam-fabric laminate was then heated by passing it over a hot roller at about 375° F.

A firm, durably bonded laminated fabric was thus formed, having bond strength comparable to that described in Example II.

EXAMPLE IV

The adhesive composition of Example I was applied by a knife coater to cotton twill employing a 10-mil thickness of wet adhesive. A polyacrylic flock of 0.5 mm. length was sifted onto the wet adhesive within 15 to 30 seconds and the flock was then oriented by means of the beater-bar technique. The flocked fabric was dried at 127° C. for 15 minutes and the loose flock was removed by blowing with a stream of air. The flock was securely bonded to the substrate and had a soft, suede-like appearance and texture.

EXAMPLE V

The laminating of Example II was repeated using the adhesive of Example I to which was added 5% solids of 60% aqueous solution, partially methylated (about 60%) trimethylol melamine, based on the polyurethane solids in the adhesive composition.

The peel strength retention of the bonded fabric when wet with perchloroethylene was 61%, as determined by the procedure of Example II.

A comparison of the peel strengths of Examples II and V was as follows:

The peel strength of the bonded fabrics of Examples II and V were determined by taking a 1 inch strip of the bonded fabric, pulling the two fabrics apart at one end, fastening one fabric to a spring scale and pulling the other fabric until separation of the two fabrics took place. The force in ounces required to separate the two fabrics is recorded as the "peel strength."

TABLE I.—PEEL STRENGTH FOR EXAMPLES II AND V

|  | Ounces | |
|---|---|---|
|  | Example II | Example V |
| Dry | 19.5 | 19.5 |
| Wet: | | |
| Water | 14 |  |
| Polychloroethylene | 10.5 | 12 |

While the present invention has been described in detail as to specific embodiments thereof, it is not intended that these details constitute undue limitations upon the scope of the invention, except insofar as the limitations appear in the appended claims.

We claim:

1. A textile material comprising a fabric bound to another material by means of an adhesive prepared by
   (1) forming an isocyanate-terminated prepolymer by reacting tolylene diisocyanate with a mixture of two glycols at a ratio of from 1.6 to 3.0 moles of diisocyanate per mole of total glycol, one of said glycols being a non-polymeric glycol of the formula:

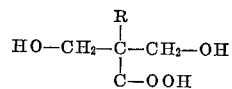

wherein R is selected from the group consisting of hydrogen and lower alkyl, the other of said glycols being a polyalkylene ether glycol of the formula:

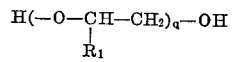

wherein $R_1$ is lower alkyl and $q$ is an integer sufficiently large to provide an average molecular weight of from 750 to 5000, the molar ratio of glycols being 0.25:1 to 2:1 respectively;
   (2) forming a latex by reacting the isocyanate terminated prepolymer in aqueous medium containing a tertiary lower alkylamine ($C_1$-$C_3$) and allowing chain extension with water to proceed until substantially all of the isocyanate groups have been reacted; and
   (3) adding a thickening agent to said latex to produce an adhesive of viscosity in the range of from 20,000 to 100,000 cps.

2. A flocked fabric according to claim 1 wherein said other material is a flocking fiber.

3. A laminated textile according to claim 1 wherein said fabric and said other material are textiles.

4. A textile material according to claim 1 wherein said other material is selected from the group of polymeric films, sheetings or foams.

5. A textile material according to claim 6 wherein said polymeric material is selected from the group consisting of poly(vinyl chloride), poly(vinyl acetate), cellulose acetate, cellulose acetate-butyrate, poly(vinyl butyral), polyethylene, polypropylene, polyurethane, polyamide, and polyester.

6. The flocked fabric according to claim 2 where said flocking fiber is selected from the group consisting of viscose rayon, polyamide, polyester, acrylic, wool, cotton, and cellulose acetate.

References Cited
UNITED STATES PATENTS

| | | | |
|---|---|---|---|
| 2,968,575 | 1/1961 | Mallonee | 260—29.2 |
| 3,412,054 | 11/1968 | Milligan et al. | 260—18 |
| 3,461,103 | 8/1969 | Keberle et al. | 260—75 NH |
| 3,658,939 | 4/1972 | Carpenter et al. | 260—75 NH |

FOREIGN PATENTS 1,128,568  9/1968  Great Britain _____ 260—29.2

GEORGE F. LESMES, Primary Examiner

R. J. ROCHE, Assistant Examiner

U.S. Cl. X.R.

161—190; 260—13, 77.5 NH, 29.2 TN, 75 NP